US011249307B2

(12) United States Patent
Birman et al.

(10) Patent No.: US 11,249,307 B2
(45) Date of Patent: Feb. 15, 2022

(54) PICTURE GENERATING UNIT HAVING INTERNAL REFLECTION REDUCTION

(71) Applicant: Continental Automotive Systems, Inc., Auburn Hills, MI (US)

(72) Inventors: Vyacheslav Birman, Auburn Hills, MI (US); Guoqing Wang, Rochester Hills, MI (US); Hao Wang, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 132 days.

(21) Appl. No.: 16/419,490

(22) Filed: May 22, 2019

(65) Prior Publication Data

US 2020/0371352 A1  Nov. 26, 2020

(51) Int. Cl.
*G02B 27/01* (2006.01)
*G02B 5/04* (2006.01)
*G02B 27/00* (2006.01)

(52) U.S. Cl.
CPC ......... *G02B 27/0101* (2013.01); *G02B 5/045* (2013.01); *G02B 27/0018* (2013.01); *G02B 2027/012* (2013.01); *G02B 2027/0118* (2013.01); *G02B 2027/0121* (2013.01)

(58) Field of Classification Search
CPC .... G02B 1/118; G02B 5/045; G02B 27/0018; G02B 2027/012; G02B 2027/0118; G02B 2027/0121
See application file for complete search history.

(56) References Cited

U.S. PATENT DOCUMENTS

| 2006/0227415 A1* | 10/2006 | Caldwell | G02B 15/143 359/432 |
| 2010/0165468 A1* | 7/2010 | Yamada | G02B 1/118 359/613 |
| 2010/0321781 A1* | 12/2010 | Levola | G02B 27/4205 359/569 |
| 2011/0051251 A1* | 3/2011 | Endoh | G02B 27/0018 359/614 |
| 2019/0258063 A1* | 8/2019 | Hudman | G06F 3/011 |

* cited by examiner

*Primary Examiner* — Ryan S Dunning

(57) ABSTRACT

Light re-reflection in a picture generation unit for a heads up display is reduced by a housing having walls that are "surfaced" to have inclined surfaces, which reflect light incident upon them toward inclined surfaces on a second and opposing surfaced wall. Re-reflections of light off the surfaced sidewalls attenuates light to a degree that it cannot generate a visible image.

12 Claims, 3 Drawing Sheets

PICTURE GENERATING UNIT HAVING INTERNAL REFLECTION REDUCTION

DETAILED DESCRIPTION

Figure 1:
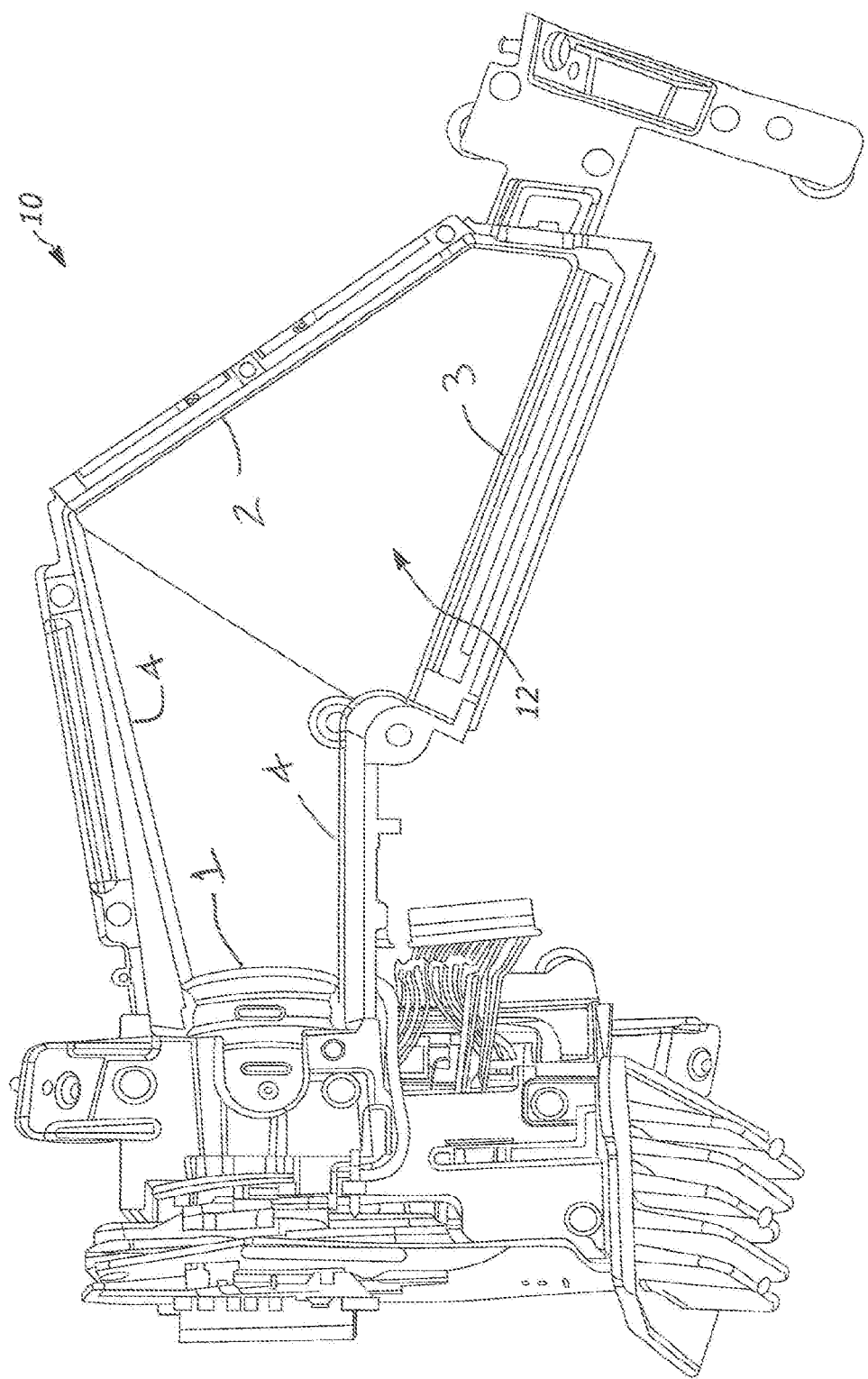
FIG. 1 is a cross-sectional diagram of a picture generation unit for a heads-up display.

FIG. 1 is a cross-sectional diagram of a picture generation unit or PGU, for a heads-up display 10. The PGU comprises a projection lens 1, through which image-generating light is emitted toward a "fold" mirror 2, which is simply a mirror inclined at an angle in order to deflect light toward a surface on which an image can be projected. Image-generating light reflected off the fold mirror 2 is reflected off, or deflected by, the fold mirror 2 toward an image surface 3. The projection lens 1, fold mirror 2 and the image surface 3 are considered herein as being part of, or contained within, a housing 12 comprised of two, "surfaced" side walls 4. The other opposing side wall 4, not shown, is a "mirror image" of the side wall 4 shown in FIG. 1.

The word "surface" is used herein as both a verb and a noun. When used as a verb, it refers to act, process or action that provides or gives a texture or physical features to a surface. The word "surfaced" should therefore be construed as the past tense form of the verb form of surface, which means that the side walls of the PGU have a physical feature or characteristic provided to them.

As described below, the side walls of the preferred embodiment of a PGU comprise substantially prism-shaped ribs, which are formed or otherwise provided to the sidewalls such that the ribs are substantially parallel to each other and each comprises two substantially planar and inclined faces extending away from a wall and which meet each other at an edge located away from the wall. The inclined lateral faces of the prism-shaped ribs reflect light that is incident upon those faces toward the opposing surfaced wall and eventually toward the fold mirror 2 from which the reflected light is directed toward the image surface.

Figure 2:
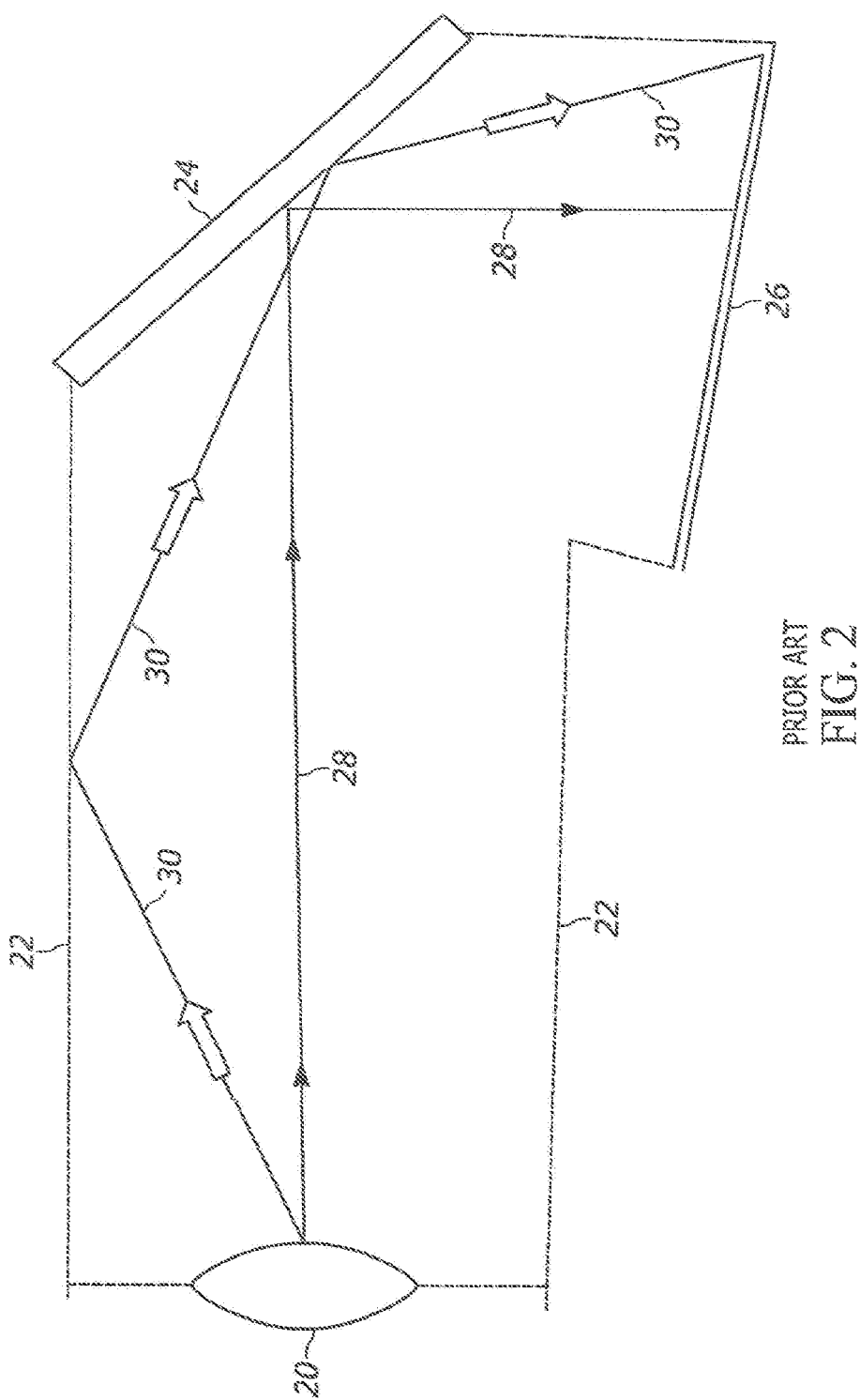
FIG. 2 is a diagram depicting light from a projection lens striking a mirror and being reflected to an image surface as well as the reflection of a secondary light being reflected by an unsurfaced wall of the picture generation unit of FIG. 1.

Referring now to FIG. 2, which is a schematic depiction of how light is reflected off the side walls of a prior art PGU, image light 28 from a projection lens 20 travels toward a fold mirror 24. The fold mirror 24 reflects image light 28 toward an image surface 26. Unfortunately, when secondary image light 30 from the projection lens 20 strikes an unsurfaced wall 22 it is reflected off the unsurfaced wall 22 toward the fold mirror 24 from which it is reflected toward the image surface 26. The secondary image light 30 reflected off of even black-colored unsurfaced walls 22 are known to be able to create an anomaly in the image projected onto the image surface 26. Suppressing the secondary image light 30 is therefore important for improving the quality of the image generated on the image surface 26.

Figure 3:
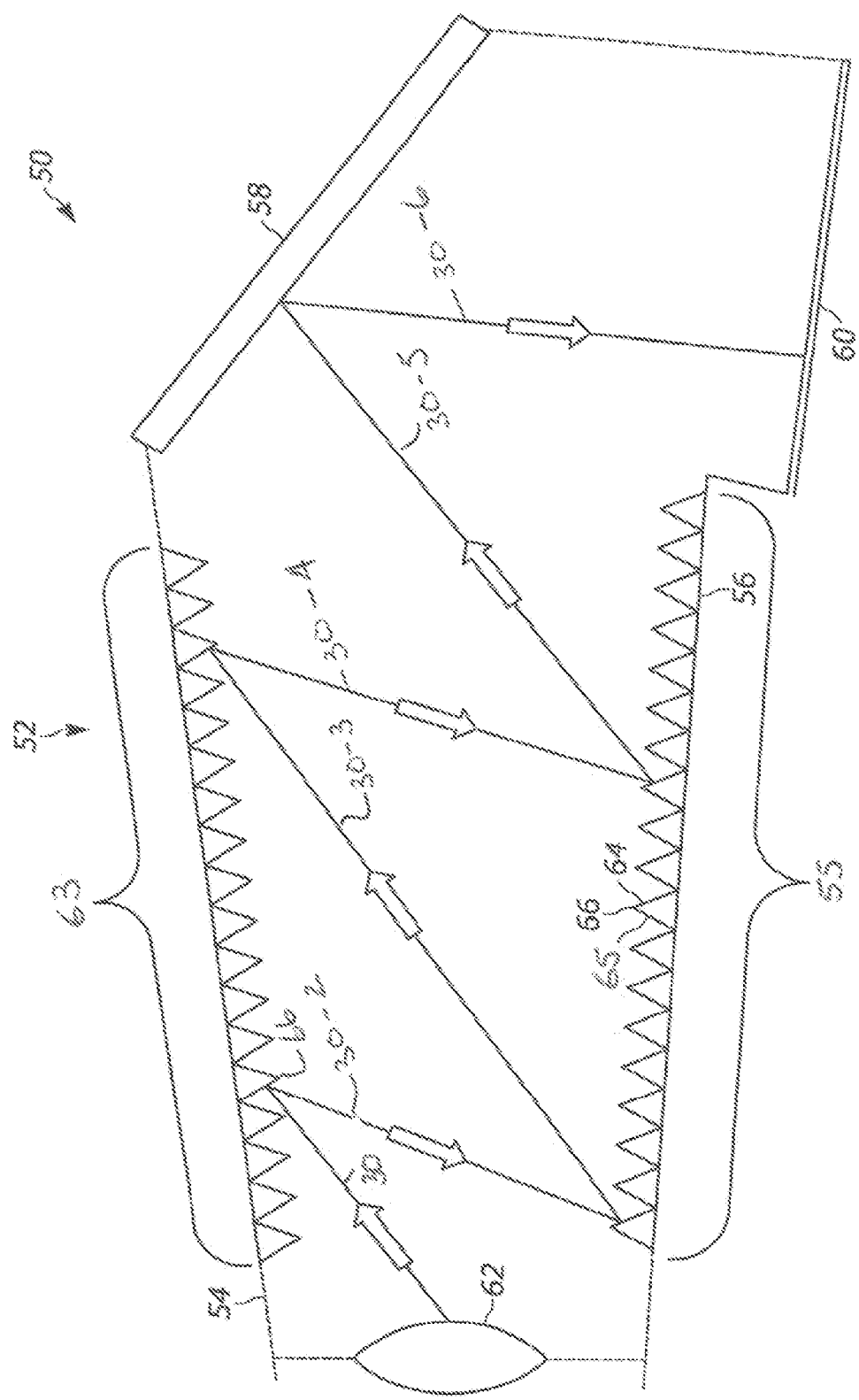
FIG. 3 is a schematic depiction of a preferred embodiment of a picture generation unit for a heads schematic-up display having surfaced walls which suppress light from a projection lens that is reflected off them.

Referring now to FIG. 3, which is a schematic depiction of light passing through a picture generation unit 50 having opposing sides 63 and 55 with surfaced side walls 54 and 56, secondary image light 30 emitted from a projection lens 62 strikes one or more inclined lateral faces 65 of one of the prism-shaped ribs 66. The angle between the two inclined lateral faces 65 and 64 is selected such that light reflected off of the surface 65 is directed toward the opposite side wall 56 and the prism-shaped ribs 66 on the other wall 56.

The light represented by reference numeral 30-2 strikes an inclined surface 64 of a prism 66 on a first wall 56 and is reflected toward the other side wall 52 to another prism-shaped rib 66. The same light, represented by reference numeral 30-3 is incident upon an inclined lateral face 65 of a prism-shaped rib 66 is again re-reflected (reference numeral 30-4) toward the second side wall 56 from which the light is reflected again (reference numeral 30-5) toward the mirror 58.

In FIG. 3, the secondary light 30 emitted from the projection lens 62 is reflected and re-reflected multiple times before it strikes the inclined mirror 58. On each reflection, the intensity of the light reflected off the surface of a prism-shaped rib is attenuated. After multiple re-reflections off of surfaces of prism-shaped ribs, the light 30-6 emitted off of the mirror 58 is attenuated so much that it is essentially not visible when it strikes an image-generating surface 60 at the far end of the picture generation unit. By providing prism-shaped ribs to the side walls of a picture generation unit, the internal reflection of light from a projection lens 62 is reduced so much that it is essentially invisible.

It is important to note that the prism-shaped ribs are considered herein as being substantially wedge-shaped. Those of ordinary skill in the art should appreciate that a wedge is a body defined by two substantially planar faces or surfaces that meet each other at a small and acute angle. In the preferred embodiment the small angle between the inclined surfaces of the wedge-shaped ribs is less than or about 30 degrees.

As used herein, a cone is a solid having a substantially circular base and which is generated by rotating a right triangle about one of its legs. In alternate embodiment, the side walls 4 of the PGU are surfaced with (processed or formed to have) small cones, the inclined surfaces of which reflect substantially the same way that the prism-shaped ribs, the substantially circular bases of which can either abut each other or be separated from each other.

As used herein a pyramid is a polyhedron having for its base a polygon and for faces, triangles with a common vertex. In another alternate embodiment, the side walls 4 of the PGU are surfaced with (to have) small pyramids, the inclined surfaces of which reflect substantially the same way that the prism-shaped ribs, the bases of which can either abut or be separated from each other.

The foregoing description is for purposes of illustration only. The true scope of the invention is set forth in the following claims.

What is claimed is:

1. A picture generation unit for a heads up display, the picture generation unit comprising:
    a housing comprising first and second opposing and surfaced walls, the housing enclosing:
        a fold mirror, configured to reflect incident light toward a surface on which an image is projected;
        a projection lens, through which image-generating light is emitted toward the fold mirror;
    wherein each of the first and second opposing and surfaced walls comprise a plurality of inclined surfaces, wherein each of the plurality of inclined surfaces reflect light incident upon them toward another of the plurality of inclined surfaces disposed on an opposing one of the first and second opposing and surfaced walls of the housing such that the inclined surfaces on the first and second opposing surfaced walls direct scattered light that is incident upon them toward the fold mirror and wherein the fold mirror directs the same light toward the surface on which an image is projected.

2. The picture generation unit of claim 1, wherein the inclined surfaces are substantially prism-shaped ribs, which are substantially parallel to each other, each of the ribs comprising two substantially planar and inclined faces extending away from a corresponding wall and which meet each other at an edge located away from the corresponding wall, the inclined faces of the prism-shaped ribs on the first surfaced and second surfaced walls.

3. The picture generation unit of claim 1, wherein the inclined surfaces are cones.

4. The picture generation unit of claim 1, wherein the inclined surfaces are prisms.

5. The picture generation unit of claim 1, wherein the first and second opposing surfaced walls are not parallel to each other.

6. The picture generation unit of claim 1, wherein the fold mirror is disposed at first angle relative to the first opposing and surfaced wall that is different than a second angle relative to the second opposing and surfaced wall.

7. The picture generation unit of claim 1, wherein the projection lens is disposed transverse to the image-generating light emitted toward the fold mirror.

8. A picture generation unit for a heads up display comprising:
   a projection lens generating an image-generating light;
   a fold mirror configured to reflect the image-generating light;
   an image generating surface receiving light reflected from the fold mirror;
   a first surfaced wall disposed between the projection lens and the fold mirror;
   a second surfaced wall disposed between the projection lens and the image generating surface;
   a plurality of inclined surfaces disposed on each of the first surfaced wall and the second surfaced wall, the plurality of inclined surfaces configured to reflect light incident upon one of the first surfaced wall and the second surfaced wall toward the other of the first surfaced wall and the second surfaced wall; and
   wherein the first and second opposing surfaced walls are not parallel to each other.

9. The picture generation unit for a heads up display as recited in claim 8, wherein the inclined surfaces are substantially prism-shaped ribs, which are substantially parallel to each other, each of the ribs comprising two substantially planar and inclined faces extending away from a corresponding wall which meet each other at an edge located away from the corresponding wall.

10. The picture generation unit for a heads up display as recited in claim 9, wherein the image generating surface is transverse to the projection lens.

11. The picture generation unit for a heads up display as recited in claim 10, wherein the fold mirror is disposed at first angle relative to the first opposing and surfaced wall that is different than a second angle relative to the second opposing and surfaced wall.

12. The picture generation unit for a heads up display as recited in claim 11, wherein the plurality of inclined surfaces on the first surfaced wall and the second surfaces wall direct incident scattered light toward the fold mirror and wherein the fold mirror directs the same light image projection surface.

* * * * *